United States Patent [19]

Kobayashi

[11] Patent Number: 5,014,786

[45] Date of Patent: May 14, 1991

[54] PRESSURE CHECKER

[75] Inventor: Yoshikazu Kobayashi, Tokyo, Japan

[73] Assignee: Nitto Kohku Co., Ltd., Tokyo, Japan

[21] Appl. No.: 489,236

[22] Filed: Mar. 5, 1990

[30] Foreign Application Priority Data

Mar. 10, 1989 [JP] Japan .................. 1-58568

[51] Int. Cl.⁵ .................. G01L 7/16
[52] U.S. Cl. .................. 116/272; 116/266; 116/DIG. 7
[58] Field of Search ......... 116/272, 266, 264, DIG. 7, 116/270, 276; 73/709

[56] References Cited

U.S. PATENT DOCUMENTS

| | | | |
|---|---|---|---|
| 1,807,752 | 6/1931 | Poster | 116/272 |
| 2,536,321 | 1/1951 | Smith et al. | 116/270 |
| 2,827,122 | 3/1958 | Clark | 116/272 |
| 3,703,879 | 11/1972 | Huthsing, Jr. | 116/270 |
| 3,738,311 | 6/1973 | Appleton | 116/272 |
| 3,964,299 | 6/1976 | Johnson | 116/272 |
| 4,164,196 | 8/1979 | Stradella et al. | 116/272 |
| 4,499,846 | 2/1985 | Bergeron et al. | 116/272 |
| 4,877,143 | 10/1989 | Travisano | 116/270 |
| 4,899,684 | 2/1990 | Houzuic et al. | 116/272 |

FOREIGN PATENT DOCUMENTS 0218703 2/1985 Fed. Rep. of Germany ...... 116/266

Primary Examiner—William A. Cuchlinski, Jr.
Assistant Examiner—C. W. Fulton
Attorney, Agent, or Firm—Nixon & Vanderhye

[57] ABSTRACT

A pressure checker for a fluid pressure source, including a main unit which includes/comprises a hollow portion which can communicate with a fluid pressure source, a cap with a window fitted on the main unit, a spool contained in the hollow portion of the main unit to be reciprocal, said spool being provided with a front end portion with a defined pressure indication surface, a compression coil spring for biasing the spool against the pressure of the fluid pressure source, and a flat light-shielding member positioned in the window of the cap, said flat light-shielding member being provided with a bag made of a material which allows at least partial transmission of light, and a light-absorbing liquid sealed in the bag, wherein the flat light-shielding member transmits light through the window toward the defined pressure indication surface when the spool is moved by the pressure of the fluid pressure source against the biasing force of the compression coil spring, and can also transmit light reflected by the defined pressure indication surface to the outside.

6 Claims, 3 Drawing Sheets

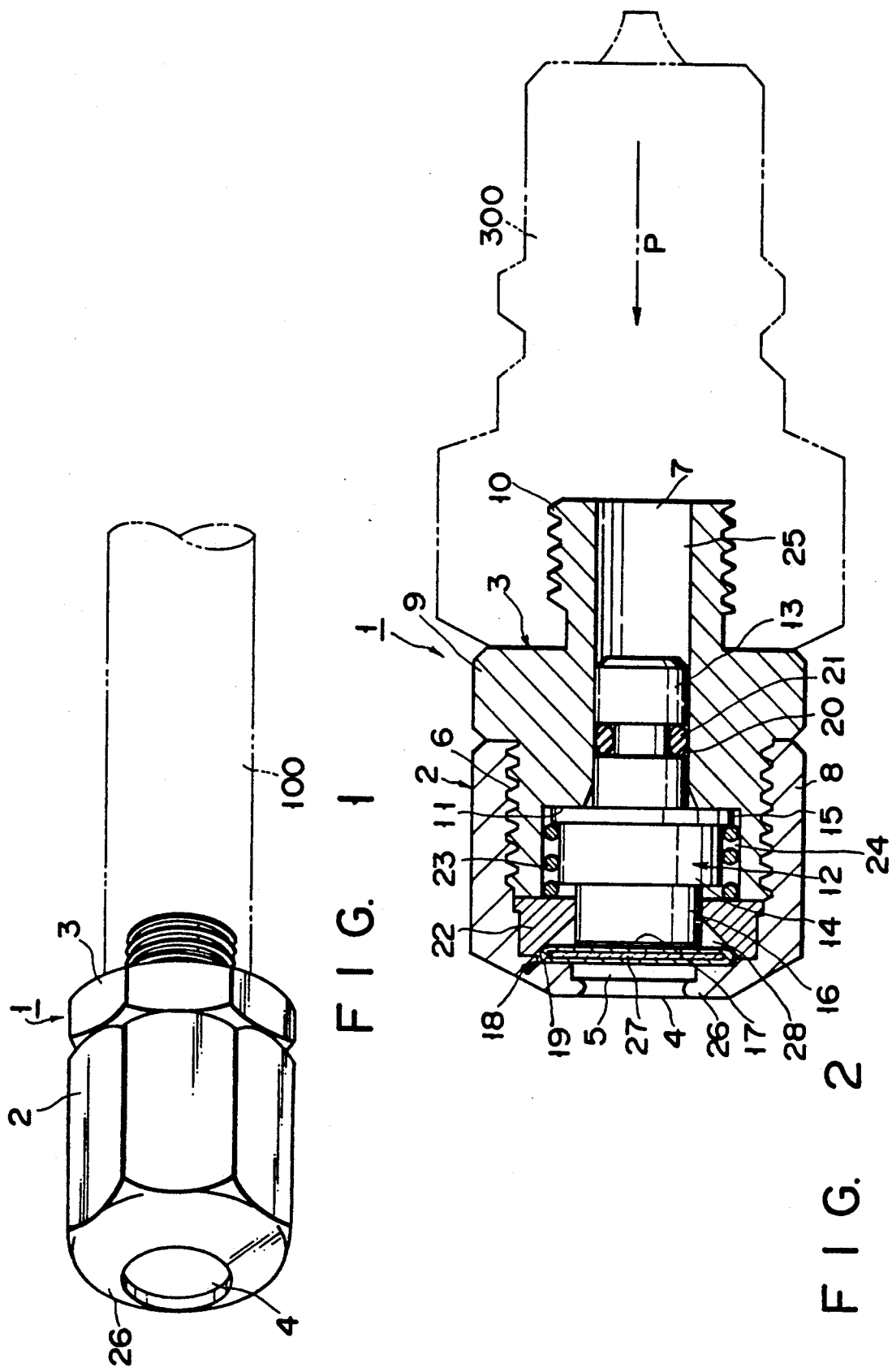

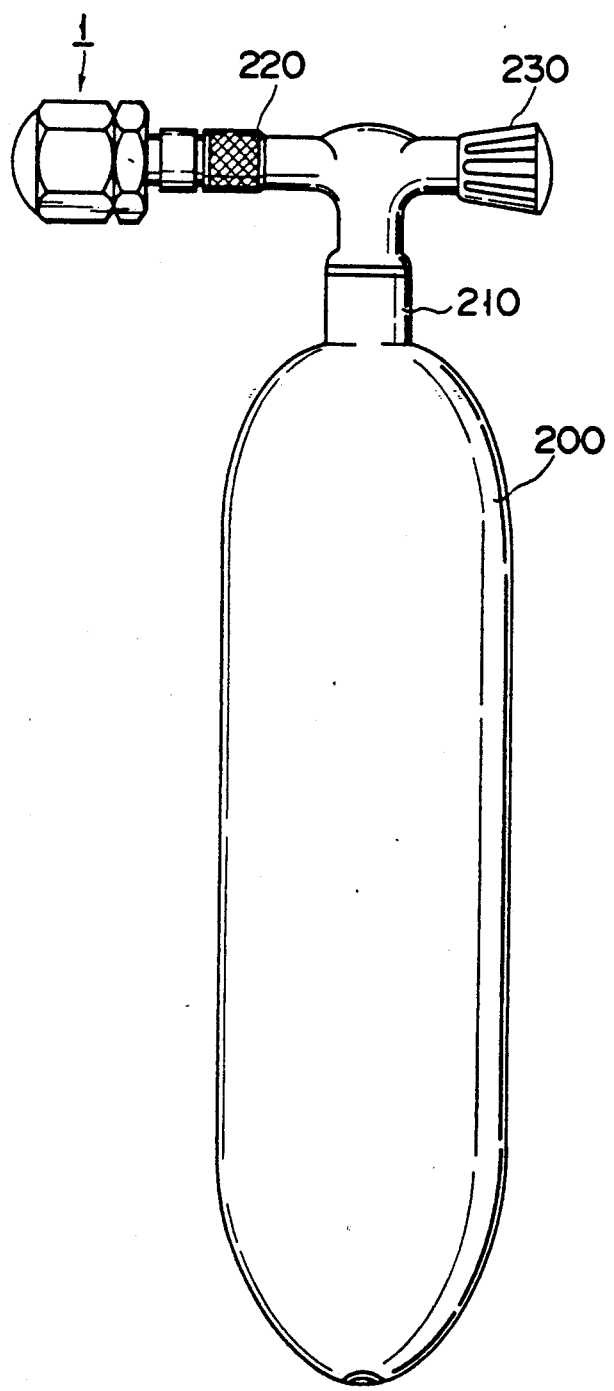
F I G. 4

PRESSURE CHECKER

BACKGROUND OF THE INVENTION

1. Field of the Invention

The present invention relates to a pressure checker which allows easy visual checking of whether the pressure in a liquid pipe is equal to a predetermined pressure.

2. Description of the Related Art

At present, high- and low-pressure fluids are delivered to homes, factories, and laboratories in a variety of applications. These high- and low-pressure fluids must be maintained at a minimum pressure, depending on their use. For example, when the pressure of a fluid in a gas cylinder is below a predetermined pressure, the gas cylinder must be quickly exchanged. In addition, when the pressure of a pressurized fluid supplied through a small fluid pipe is below a predetermined pressure, the amount of stored fluid must be increased in order to increase the pressure of the fluid in the storage tank.

In order to confirm a change in pressure of a supplied fluid, a pressure gauge is conventionally used.

It is known that some application fields which conventionally use pressure gauges do not always require a pressure gauge. However, it is appreciated for the sake of safety that a time for exchanging an object, such as a gas cylinder, or remaining amount of fluid therein can be found out, or that a fluid pressure can be checked in a simple way. Therefore, a demand has arisen for developing a gauge which allows accurate and easy confirmation of a change in pressure of fluid without the conventional gauge.

SUMMARY OF THE INVENTION

It is an object of the present invention to provide a gauge which allows easy visual checking of whether a supplied fluid is being maintained at a satisfactory pressure, in place of a conventional pressure gauge.

In order to achieve the above object, according to the present invention there is provided a gauge comprising a main unit including a hollow portion which can communicate with a pipe or a cylinder, and a window cap fitted on the main unit, wherein a spool having an appropriate defined pressure indication surface on its front end portion is biased in an opposite fluid pressure load direction by means of a compression coil spring fitted in the main unit, a flat light-shielding member is obtained by sealing a light-absorbing liquid in a transparent or semi-transparent bag attached to the window cap, and the flat light-shielding member can be urged on the defined pressure indication surface of the spool.

A pressure checker according to the present invention is disposed on, e.g., an LP gas cylinder or LP gas kitchen equipment. The checker may be disposed such that leakage of a fluid into branch pipes connected to the gas cylinder or range can be prevented. When the valve of the gas cylinder is opened, and fluid is supplied to the pipe, the pressure of the fluid is applied to the rear end face of the spool. If the fluid pressure at this time is larger than the elastic force of the compression coil spring which biases the spool in the opposite fluid pressure load direction, the spool is urged toward the window of the cap against the elastic force of the compression coil spring. When the fluid pressure is lower than the predetermined pressure, the spool is moved backward because the elastic force of the compression coil spring is larger than the fluid pressure.

When the spool is urged toward the window of the cap, therefore, the defined pressure indication surface at the front end of the spool urges the flat light-shielding member at the window of the cap to deform. When the light-absorbing liquid filled in the flat light-shielding member is pushed out toward the periphery, the front and rear wall surfaces are brought into tight contact with each other, and the defined pressure indication surface of the spool appears through the window via the flat light-shielding member. Thus, it can be known that the pressure of the fluid which flows through the pipe is kept at a predetermined pressure.

When the pressure of the fluid is lower than the elastic force of the compression coil spring, the spool is urged toward the rear portion of the main unit by the elastic force of the compression coil spring. Therefore, the function of urging the flat light-shielding member disappears, and the shape of the flat light-shielding member, urged by the fluid pressure, returns to its flat shape. The light-absorbing liquid scattered in the periphery also returns to its original state. As a result, light reflected by the defined pressure indication surface is absorbed in the light-absorbing liquid, and the defined pressure indication surface of the spool cannot be externally observed, thus indicating a reduction in fluid pressure.

According to the present invention, for example, when the pressure checker is disposed on a fluid pipe or a gas cylinder, the defined pressure indication surface can be visually observed through the window of the cap. In addition, when the fluid pressure is smaller than the elastic force of the compression coil spring which biases the spool, it can be easily seen whether the pressure of the fluid is larger or smaller than the predetermined pressure in accordance with whether the defined pressure indication surface can be visually observed through the window of the cap. Furthermore, the pressure checker of the present invention has a simple structure wherein the defined pressure indication surface appears or disappears in correspondence with the movement of the spool, which moves by means of the interaction of the compression coil spring and the fluid pressure, thus representing a change in fluid pressure. Therefore, a compact and lightweight pressure indicator can be realized. This pressure checker can be conveniently and easily disposed at a narrow portion, and can be manufactured at low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrates presently preferred embodiments of the invention and, together with the general description given above and the detailed description of the preferred embodiments given below, serve to explain the principles of the invention.

FIG. 1 is a schematic perspective view of a pressure checker according to an embodiment of the present invention;

FIG. 2 is an enlarged longitudinal sectional side view showing the operating state of the pressure checker shown in FIG. 1 when the fluid pressure is below a defined pressure;

FIG. 4 is a side view showing an arrangement wherein the pressure checker according to the present invention is mounted on a gas cylinder.

DETAILED DESCRIPTION OF THE PREFERRED EMBODIMENT

Figure 3:
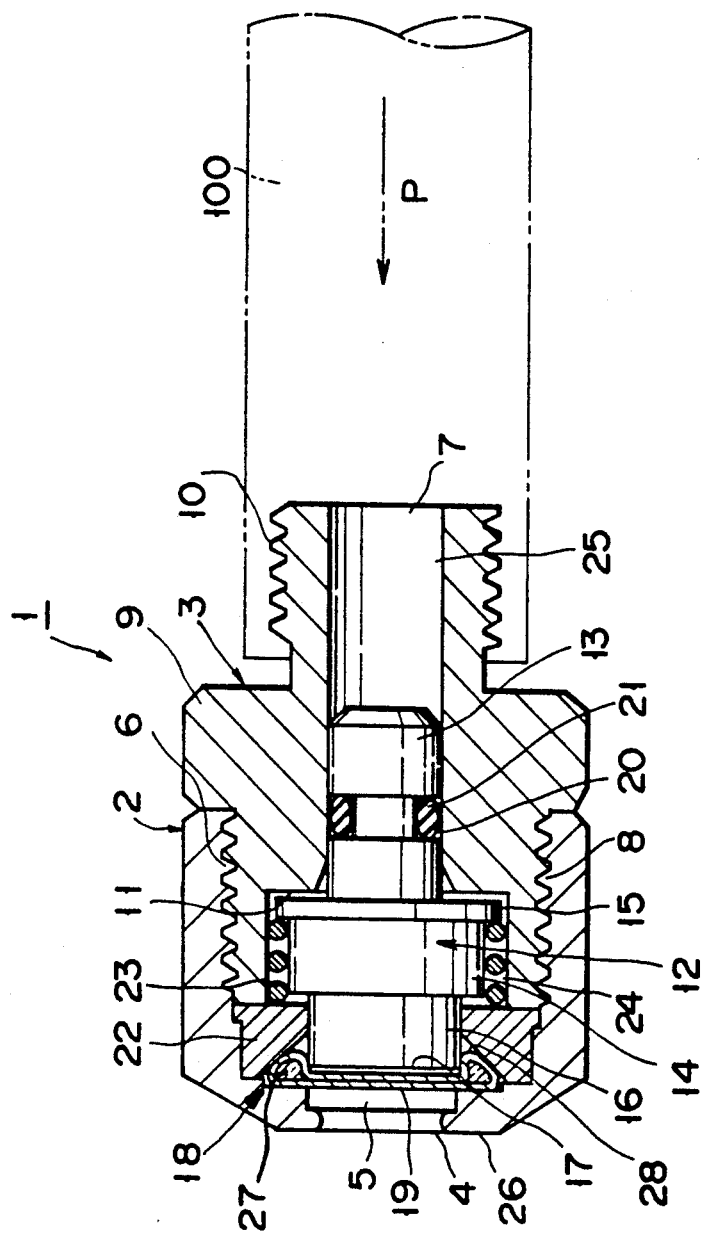
FIG. 3 is an enlarged longitudinal sectional side view showing the state wherein the fluid pressure is kept at the defined pressure.

The present invention will be described hereinafter on the basis of an embodiment shown in the accompanying drawings.

Referring to FIGS. 1 to 3, reference numeral 1 denotes an embodiment of the pressure checker. The pressure checker 1 includes a main unit 3 and a window cap 2.

The main unit 3 is a cylindrical member including a hollow portion 7 which can communicate with a fluid pipe 100 or a branch pipe of a pressurized fluid cylinder 200. An external thread portion 6 and a large-diameter hexagon collar 9 are formed on the outer surface of the front end portion of the main unit 3. The external thread portion 6 is engaged with the window cap 2. The hexagon collar 9 is formed after the external thread portion 6. In addition, an external thread portion 10 is formed on the outer surface of the rear end portion.

The external thread portion 10 is used to connect the pressure checker to the pipe 100 or the branch pipe of the cylinder 200. In this embodiment, a plug 300 with a one-touch coupling valve (not shown in detail) can be threadably engaged with the external thread portion 10. Note that, in this case, a socket which is paired with the valve plug 300 disposed on the pipe 100 side incorporates a valve which is opened and engaged therewith upon connection. When the socket is to be connected to the plug 300, therefore, the pressure of the fluid in the pipe 100 or the cylinder 200 is always applied to the hollow portion 7. In addition, the hollow portion 7 of the main unit 3 includes a large-diameter hole 24 formed at the front end and a small-diameter hole 25 formed at the rear end.

The window cap 2 has a cap-nut shape. The cap 2 has an internal thread portion 8 threadably engaged with the external thread portion 6 of the main unit 3. A window 4 is formed in the head 26 of the cap 2. A transparent plate 5 is mounted in the window 4. The transparent plate 5 is made of a material such as glass or a hard plastic. Taking into account a case wherein the checker is used outside, the transparent plate 5 is generally made of a weather resistant material. Note that although the flat transparent plate is used in this embodiment, a transparent plate having an outer surface (on the left side in FIG. 2) which projects in a convex lens manner may also be used.

Reference numeral 12 denotes a spool fitted in the main unit 3 so as to be reciprocal in the axial direction. The spool 12 includes a sliding guide 13, a body 14, and a front end portion 16. The sliding guide 13 is hermetically and slidably fitted in the small-diameter hole 25 of the main unit 3. The body 14 is positioned in the large-diameter hole 24, and has a collar 15 which is brought into contact with or spaced apart from a stepped portion 11 between the large- and small-diameter holes 24 and 25. The front end portion 16 is positioned at the front end of the body 14, and projects toward the rear surface of the window 4. The end face of the front end portion 16 is properly colored to form a defined pressure indication surface 17. Reference numeral 20 denotes a peripheral groove formed in substantially the central portion of the sliding guide 13 in the circumferential direction. An O-ring 21 is fitted in the peripheral groove 20 to seal the inner circumferential surface of the small-diameter hole 25.

Reference numeral 22 denotes a supporter ring inserted between the main unit 3 and the window cap 2 to support the front end portion 16 of the spool 12. A compression coil spring 23 is mounted between the supporter ring 22 and the collar 15 of the spool 12 to bias the spool 12 in the direction opposite that of the fluid pressure load, i.e., rightward in FIG. 2. When the elastic force of the compression coil spring 23 is larger than the pressure of the fluid, the defined pressure indication surface 17 formed on the front end face of the spool 12 is spaced apart from a flat light-shielding member 18.

The flat light-shielding member 18 is mounted on the rear surface of the window 4 of the window cap 2. The light-shielding member 18 is arranged between the transparent plate 5 mounted on the window 4 of the window cap 2 and the front end portion 16 of the spool 12 and is brought into contact with the transparent plate 5. The member 18 has a so-called pouch-like shape, and a structure wherein a light-absorbing liquid 27 is sealed in a flexible circular transparent flat bag 19. A black or dark color liquid which is suitable for light absorption is mainly used as the light-absorbing liquid 27.

The flat light-shielding member 18 is deformed when a central portion thereof, at least a portion which corresponds to the rear surface of the window 4 of the window cap 2, is urged by the urging force of the front end portion 16 of the spool 12, sliding against the elastic force of the compression coil spring 23 due to the fluid pressure, and the light-absorbing liquid 27 in the member 18 is pushed out toward the periphery. As a result, the central portion has a thickness of only the bag 19.

Reference numeral 28 denotes a space for allowing the movement of the light-absorbing liquid 27 toward the periphery of the bag 19 when the flat light-shielding member 18 is urged by the defined pressure indication surface 17. This space 28 allows a free increase in thickness of the periphery of the flat light-shielding member 18 when the light-absorbing liquid is moved toward the periphery of the bag 19.

An operation of the above embodiment will be described hereinafter.

When the main unit 3 is not attached to the fluid pipe 100, the spool 12 is urged by the elastic force of the compression coil spring 23 to move towards the right in FIG. 2. The entire flat light-shielding member 18 is uniformly filled with the light-absorbing liquid 27 contained in the bag 19. In this state, light reflected by the defined pressure indication surface 17 disposed on the front end face of the spool 12 is absorbed in the dark black light-absorbing liquid 27. Light incident on the defined pressure indication surface 17 is shielded by the light-absorbing liquid 27, and the surface 17 cannot be externally and visually observed through the window 4 of the cap 2.

As described above, when the pressure checker, the defined pressure indication surface 17 of which is shielded when no fluid pressure is applied to the spool 12, is attached to the fluid pipe 100, and pressurized fluid is then supplied to the pipe 100, the spool 12 is urged towards the left by the fluid pressure. When a desired fluid pressure larger than the elastic force of the compression coil spring 23 is applied to the spool 12 from the rear portion (assuming that this fluid pressure is a defined pressure), the compression coil spring 23 around the spool 12 is compressed, moving the spool 12 toward the window 4 of the cap 2.

When the spool 12 is moved as described above, the defined pressure indication surface 17 on the front end portion 16 urges the flat light-shielding member 18, arranged on the rear portion of the window 4 of the cap 2, forward. The bag 19 which constitutes the flat light-shielding member 18 and the light-absorbing liquid 27 contained inside the bag 19 are compressed by the urging force at this time, and the front and rear surfaces of the bag 19 are brought into contact with each other. At this time, the light-absorbing liquid 27 is moved toward the periphery of the bag 19, and the light-absorbing function disappears.

The light reflected by the defined pressure indication surface 17, therefore, transmits through the flat light-shielding member 18, and the defined pressure indication surface 17 of the spool 12 can be externally and visually observed through the window 4 of the cap 2.

Thus, when the defined pressure indication surface 17 can be visually observed, it is known that the fluid pressure in the pipe 100 is normal, and the supply and consumption amounts are balanced.

Assume that the amounts of supply and consumption of the fluid are unbalanced, and the fluid pressure is reduced. When the elastic force of the compression coil spring 23 becomes larger than the urging force of the spool 12, the spool 12 is moved towards the right in FIG. 2 by the urging force of the compression coil spring 23, and the flat light-shielding member 18 becomes free from compression. At this time, the bag 19 which constitutes the flat light-shielding member 18 causes the light-absorbing liquid 27 contained therein to return to its original state. The bag 19 is restored to a uniform thickness, and the defined pressure indication surface 17 cannot be externally and visually observed. The appearance of this state indicates that the pressure of the fluid has dropped below the defined pressure.

FIG. 4 shows an example wherein the pressure checker of the present invention is attached to a gas cylinder 200. The pressure checker is attached to a branch pipe of a gas discharge port 210 of the gas cylinder 200 using a coupling 220. In this example, when the cock 230 of the gas cylinder 200 is opened, the LP gas in the gas cylinder 200 is gasified in the conventional manner. The gas is supplied to the branch pipe of the gas discharge port 210, and the pressure of the gas is applied to the spool 12 of the pressure checker 1. In the same manner as in the above embodiment, while the defined pressure in the gas cylinder 200 is kept, the defined pressure indication surface 17 can be visually observed through the window 4 of the cap 2. When the pressure in the gas cylinder 200 becomes lower than the defined pressure, the defined pressure indication surface 17 cannot be observed by the flat surface member 18. Thus, the amount of gas remaining in the gas cylinder 200 can be known.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A pressure checker for a fluid pressure source, comprising:
   a main unit including a hollow portion which can communicate with a fluid pressure source;
   a cap with a window fitted on said main unit;
   a spool reciprocally contained in the hollow portion of said main unit, said spool being provided with a front end portion with a defined pressure indication surface;
   a compression coil spring for biasing said spool against the pressure of said fluid pressure source; and
   a flat light-shielding member positioned in said window of said cap, said flat light-shielding member being provided with a bag made of a material which allows at least partial transmission of light, and a light-absorbing liquid sealed in said bag, characterized in that
   said flat light-shielding member transmits light through said window toward said defined pressure indication surface when said spool is removed by the pressure of said fluid pressure source against the biasing force of said compression coil spring, and can also transmit light reflected by said defined pressure indication surface to the outside,
   and wherein the hollow portion of said main unit includes a small diameter hole, a large diameter hole, and a stepped portion formed between the small and large diameter holes, and said spool includes a sliding guide positioned in the small diameter hole, a body positioned in the large diameter hole, a front end portion, and a collar which is positioned between said body and said guide and is urged against said stepped portion by the biasing force of said spring.

2. A checker according to claim 1, wherein said cap includes a transparent plate fitted in said window, said flat light-shielding member having one side which can be supported by said transparent plate, and another side urged by said indication surface.

3. A checker according to claim 2, wherein said spool is formed such that said front end portion has a diameter smaller than that of said body and that of said flat light-shielding member.

4. A checker according to claim 3, which further comprises a supporter ring, positioned in said cap, for guiding the outer surface of said front end portion of said spool, said supporter ring forming a space together with said front end portion and said transparent plate, said space being able to contain an increased amount of said light-absorbing liquid pushed out by said transparent plate and said indication surface when said flat light-shielding member is urged by said front end portion of said spool.

5. A checker according to claim 4, wherein said bag of said flat light-shielding member is made of a material having an elastic force.

6. A checker according to claim 5, wherein said sliding guide of said spool is sealed by the small-diameter hole of said main unit.

* * * * *